Aug. 12, 1969  A. J. LANGDON  3,460,742

PEELABLE TRANSPARENT ENVELOPE FOR STERILE ARTICLES

Filed Jan. 29, 1968

INVENTOR.
ARTHUR J. LANGDON

ATTORNEYS

# 3,460,742
PEELABLE TRANSPARENT ENVELOPE FOR STERILE ARTICLES

Arthur J. Langdon, East Hampton, Conn., assignor to Edward Weck & Company, Inc., Long Island City, N.Y., a corporation of Delaware
Filed Jan. 29, 1968, Ser. No. 701,320
Int. Cl. B65d 33/16; A61b 19/02
U.S. Cl. 229—62                                        8 Claims

ABSTRACT OF THE DISCLOSURE

A sterilizable transparent plastic envelope for retaining articles before, during and after sterilization and maintaining sterility of the contents for several months. One end of the envelope is left open for receiving the article to be stored, whereupon it may be sealed for sterilization and storage. The other end is formed with sealed paper tabs which are readily peeled open to expose the enclosed sterile article for removal.

FIELD OF THE INVENTION

This invention relates in general to packaging techniques and more particularly concerns a peel-open sterilizable envelope for retaining articles before, during and after sterilization and for maintaining sterility for a substantial length of time.

BRIEF DISCUSSION OF THE PRIOR ART

It is common practice to package and store surgical instruments, surgeons' gloves, dressings, sutures and like articles in sealed envelopes in order to retain these articles in sterile condition until they are used. In the commercial application of this practice, a sterilized article or an article to be sterilized is often furnished by the manufacturer thereof in a sealed envelope capable of withstanding sterilization in a steam autoclave or by exposure to sterilant gases. When the article is to be used, the envelope is opened by some appropriate method which hopefully, does not cause the article to become contaminated before it can be put into use for its intended purpose. Various types of envelope materials are used, and while paper is most frequently employed because of its ease of fabrication, its inherent porosity which enhances sterilization and its economy, such packages have at times been made of plastics, metal foil or metal foil laminates.

The prior packaging techniques give rise to certain disadvantages. If the body of the packages are not transparent, care must be exercised to ensure that each package is properly labeled as to its contents. However, wholly transparent plastic packages have no provision for affixing the date of sterilization of the contents. It is quite important that such date be readily available for each package. Most of the prior packages have longitudinal side seals which are subject to possible leaks and premature rupture during handling and storage. The materials used in some of the packages are not sufficiently strong to enable them to be safely employed for storage of relatively bulky or sharp-edged articles. However, where materials have been used to provide transparency or strength or both, a significant problem exists with respect to retrieving the contents without contaminating them. A characteristic of many plastics is that after sealing the package is difficult to open.

Many of the prior packages, including those made of plastics, may be opened only by cutting or tearing, resulting in contamination of the edges of the opening. Since it is quite difficult to prevent the enclosed sterilized article from coming into contact with such contaminated edges when the article is being withdrawn, the protection afforded by the closed package is likely to be completely nullified before the article may be put into use.

SUMMARY OF THE INVENTION

Broadly speaking, the present invention provides a transparent envelope, the walls of which have sufficient strength to provide sterile protection for an extended period of time for articles of various shapes and sizes while allowing easy opening and withdrawal of the articles therefrom without danger of contamination from the package opening. A particularly important feature of the envelope of this invention is that the user, such as a doctor, nurse or a packager of medical and surgical supplies, may place any desired article into the envelope and heat seal it, after which the thus completed package and its contents may be sterilized by autoclave or gas sterilization. One end of the envelope is provided with peelably sealed material so that when the contents of the envelope are to be used, that end is simply peeled open. When the end is peeled open, two opposed sterile surfaces are exposed which serve to protect the enclosed article from contamination during its removal.

The envelope constructed according to this invention comprises a flat sleeve of thermoplastic transparent film which has sealed within one end thereof a pocket preferably formed of a material which is different than the sleeve. The pocket is ideally made of two paper tabs, three of the margins of which are adhered together with a peelable material in facing relationship leaving one open end which is sealed within one end of the plastic sleeve to effectively extend and close that end of the interior of the sleeve. Paper tabs provide an area for recording the description of the contents, the date of sterilization, and any other information desired. The other end of the envelope remains unsealed to permit insertion of articles which are to be sterilized and stored. When an article is inserted into the envelope, the open end is heat sealed by any convenient means and the entire package together with its contents may be sterilized through the use of steam or sterilant gases. The sealed ends of the paper tabs, which protrude from the plastic sleeve, are made with corner portions which are not sealed together so that they may be easily grasped and peeled apart to expose the interior of the envelope allowing the article therein to be removed. The ends of the paper tabs may be dissimilar in length to further facilitate their separation.

The use of a thermoplastic transparent sleeve as the body of the envelope permits the contents to remain fully visible while within the envelope and at the same time provides protection for the enclosed articles whether they be thin or bulky, smooth or irregularly shaped.

DESCRIPTION OF THE PREFERRED EMBODIMENT

Figure 1:
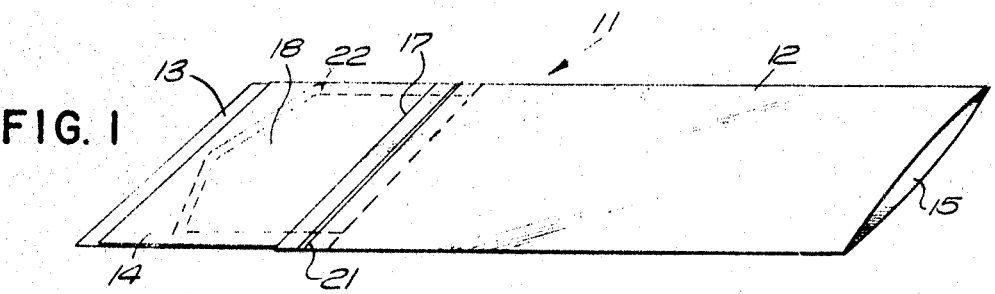
FIG. 1 is a perspective view of an envelope constructed in accordance with the principles of this invention.
Figure 2:
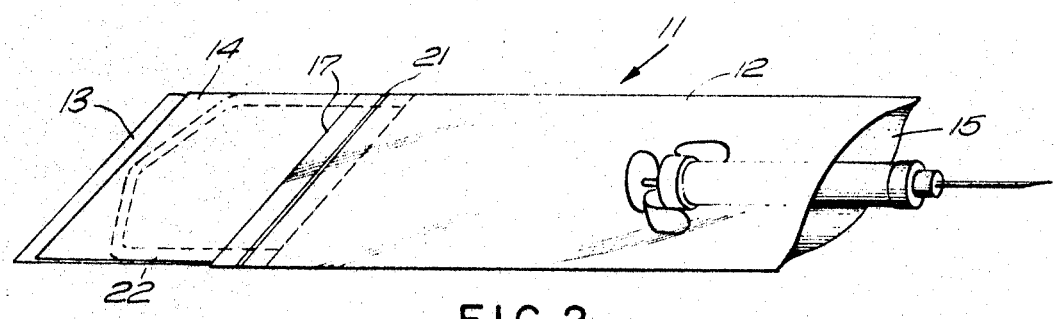
FIG. 2 is a perspective view of the envelope of FIG. 1 being filled through its open end.
Figure 3:
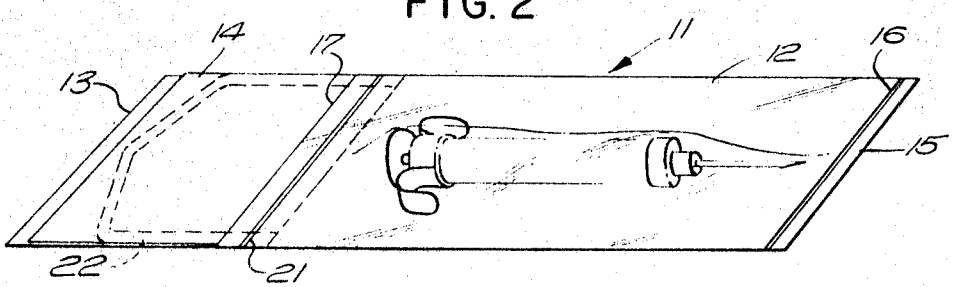
FIG. 3 is a perspective view of the envelope of FIG. 2 after the open end has been sealed.

With reference now to the drawing, there is shown an envelope designated generally by reference numeral 11 having a flat sleeve 12 and tabs 13 and 14 sealed together to form pocket 18. End 15 of sleeve 12 is shown open in FIG. 1 and FIG. 2 and sealed at line 16 in FIGS. 3 and 4. The open end of pocket 18 is sealed to the interior surface of sleeve 12 at end 17 as indicated by line 21. A narrow band of adhesive which seals the confronting surface margins of paper tabs 13 and 14 together is indicated by dotted lines 22 in FIGS. 1, 2 and 3 and by full lines 22 in FIG. 4.

Certain thermoplastics have been found to provide the necessary qualities of strength, transparency and permeability to sterilizing gas and steam while being impervious to dust and bacteria. Among these thermoplastics is nylon, which is the specific plastic used as the example herein. Nylon has the qualities listed above and is additionally readily heat sealable and withstands the autoclave temperatures necessary for sterilization. Polyethylene may also be employed to make sleeve 12, but its use is generally limited to gas sterilization only. Sterilizable paper such as #25 Claremont white kraft paper has been found suitable for paper tabs 13 and 14. Other types of paper having the requisite characteristics of permeability to steam and sterilizing gas and imperviousness to dust and bacteria are equally suitable. However, the tabs may be made of any suitable materials having the required characteristics, including plastics, as long as they may be peelably adhered to each other.

It has been found that nylon is heat sealable to #25 Claremont white kraft paper and forms a relatively strong bond thereto. The adhesive used to seal tabs 13 and 14 together may be a thermoplastic cement which is sufficiently adherent to provide the necessary bacteria-tight seal while permitting the tabs to be readily peeled apart without rupturing the paper when the envelope is being opened. A pressure sensitive adhesive may be used if desired. It should be observed that sleeve 12 and pocket 18 when sealed together at 21 form a unitary envelope having the required characteristics to retain surgical articles before, during and after sterilization and to also maintain the sterility of the contents over periods of many months.

Although sleeve 12 is ideally shown and described as an extruded seamless sleeve, it is understood that it may be made of two sheets of plastic which are heat sealed together along their long edges to form the flat sleeve.

For optimum usefulness, the envelope described herein must be easily sealable after an article has been inserted so that it may be filled and sealed "on the job" if desired or by a packaging company if it intends to provide pre-packaged medical and surgical articles. A relatively inexpensive device which will properly heat seal end 15 of envelope 11 is an Audion impulse sealer made for Packaging Aids Corporation of New York city. With this device at hand, a nurse, after thoroughly cleaning surgical instruments, may insert them into individual envelopes, heat seal each envelope and place a number of the sealed packages into an autoclave for sterilization. When the package has been properly sterilized, the contents are fully protected and their sterility maintained by the sealed envelope during subsequent handling and storage. The thus stored articles are then ready for use without further preparation.

Figure 4:
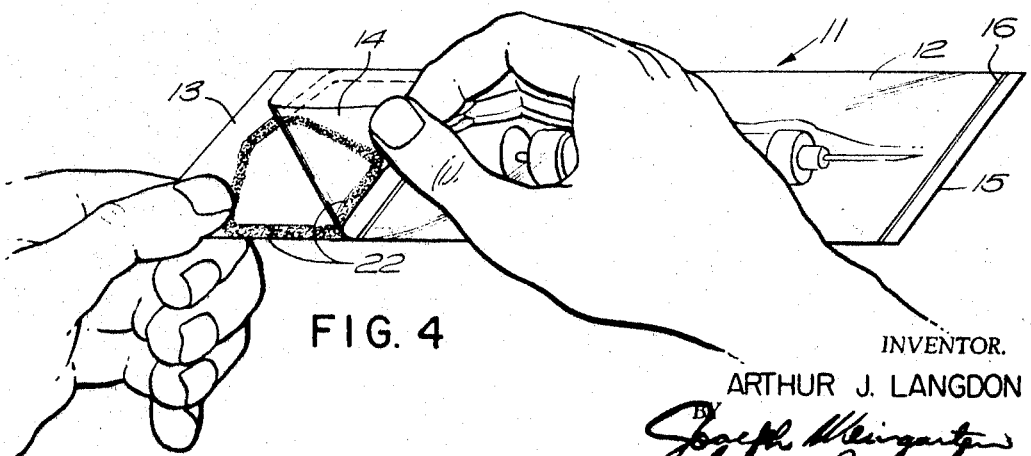
FIG. 4 shows the envelope of FIG. 3 being opened for use of the article enclosed therein.

To enable envelope 11 to be easily opened, the facing corners of tabs 13 and 14 extending beyond sleeve 12 are free of adhesive as shown in the drawing. This configuration allows the exposed corners of the tabs to be easily separated and grasped for peeling the envelope open as shown in FIG. 4. To further facilitate separation of the tabs, one of them may, if desired, be made longer than the other so that it can be grasped separately and bent back to separate it from the other. When the paper tabs have been peeled apart, the enclosed article may then be readily removed by inverting envelope 11 or through the use of sterile forceps or the like. In this regard it is well to note that the entire interior of sleeve 12 and the facing surfaces of tabs 13 and 14 which are inward of adhesive area 22 are sterile when the envelope is opened so that if tabs 13 and 14 are peeled back down the sides of envelope 11, the enclosed article may be removed without any danger of coming in contact with external surfaces of the envelope which may have become contaminated.

In addition to providing easy opening means, tabs 13 and 14, which are designed to be written on, offer other advantageous features for envelope 11. The exterior surfaces of the tabs may be easily imprinted with such legends as instructions for use or the manufacturer's name and trademarks. The printing may be done with an ink which changes color when autoclaved so that sealed but unsterilized articles will not be mistaken for those which have been previously processed. The tabs also provide space upon which may be written the identity of the article enclosed, if desired, and the date on which it was processed.

What is claimed is:

1. An envelope for enclosing and retaining articles before, during and after sterilization, comprising:
   an open-ended sleeve of flexible thermoplastic heat-sealable film;
   a first tab of sheet material;
   a second tab of similar sheet material; and
   adhesive means for peelably sealing said tabs together at their margins in face-to-face relationship with the edges at the inward end thereof remaining unsealed, thereby forming a pocket-shaped structure open at said inward end, the exterior edge of said open inward end of said pocket-shaped structure being substantially coextensive with the edge of one end of said open-ended sleeve, said open inward end of said pocket-shaped structure being sealed to said sleeve within said one end thereof, the closed outward end of said pocket-shaped structure extending outwardly from said sleeve to form a sealed extension of the interior thereof.

2. The envelope as recited in claim 1, wherein:
   said first and second tabs are dissimilar in length to provide outward ends which are offset with respect to each other; and
   said adhesive means between the confronting surfaces of said first and second tabs is inwardly displaced from at least one outward corner of said pocket-shaped structure permitting the confronting tabs of said corner to be freely separated.

3. The envelope as recited in claim 2, wherein:
   said envelope may be opened by pulling apart said tabs at said outward corner, said adhesive means allowing such separation without damage to said tabs.

4. The envelope as recited in claim 3, wherein:
   the plastic of said thermoplastic sleeve is transparent and permeable to sterilizing gases and steam while being impervious to dust and bacteria, is heat sealable to itself and to said tabs and withstands sterilization temperatures.

5. The envelope as recited in claim 4, wherein:
   the tabs forming said pocket-shaped structure are formed of a paper which is permeable to sterilizing gases and steam while being impervious to dust and bacteria.

6. The envelope as recited in claim 1, wherein:
the other end of said sleeve may be heat sealed to close the interior of said envelope.

7. The envelope as recited in claim 3, wherein:
said adhesive means is a heat sealable thermoplastic cement.

8. The envelope as recited in claim 1, wherein:
said first and second tabs are rectangular;
said adhesive means is a continuous narrow band extending along both side margins of said pocket-shaped structure from the open inward end thereof toward the closed outward end and between said side margins in an outwardly directed V-shape, thereby defining confronting triangular-shaped adhesive-free outward corners on said tabs; and wherein
said envelope may be filled through the other end of said sleeve, which end is heat sealable.

References Cited

UNITED STATES PATENTS

| | | | |
|---|---|---|---|
| 3,217,871 | 11/1965 | Lee | 206—63.2 |
| 3,278,109 | 10/1966 | Salway | 229—62 |
| 3,332,549 | 7/1967 | Powell | 206—63.2 |

DAVID M. BOCKENEK, Primary Examiner

U.S. Cl. X.R.

206—63